(12) United States Patent
Bühler et al.

(10) Patent No.: US 11,959,563 B2
(45) Date of Patent: Apr. 16, 2024

(54) MEMBRANE VALVE

(71) Applicant: Festo SE & Co. KG, Esslingen (DE)

(72) Inventors: Andreas Bühler, Stuttgart (DE); Bengt Erich Wunderlich, Ostfildern (DE); Tobias Schuster, Reutlingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/874,567

(22) Filed: Jul. 27, 2022

(65) Prior Publication Data
US 2023/0030052 A1 Feb. 2, 2023

(51) Int. Cl.
F16K 7/14 (2006.01)
F16K 31/06 (2006.01)
F16K 31/10 (2006.01)

(52) U.S. Cl.
CPC ........... F16K 7/14 (2013.01); F16K 31/0641 (2013.01); F16K 31/10 (2013.01)

(58) Field of Classification Search
CPC .. F16K 31/10; F16K 31/0064; F16K 31/0672; F16K 7/14; F16K 11/14; F16K 11/16
See application file for complete search history.

(56) References Cited

U.S. PATENT DOCUMENTS

| | | | | |
|---|---|---|---|---|
| 258,500 | A * | 5/1882 | Storer | F16K 31/10 251/282 |
| 1,766,703 | A * | 6/1930 | Bridgham | F16K 11/16 137/627 |
| 2,570,450 | A * | 10/1951 | Hottenroth | F16K 31/10 137/870 |
| 2,799,101 | A * | 7/1957 | Miller | F16K 31/10 137/614.19 |
| 4,268,009 | A * | 5/1981 | Allen, Jr. | F16K 31/10 251/129.2 |
| 8,752,584 | B2 * | 6/2014 | Grandvallet | F16K 31/10 137/553 |
| 9,091,368 | B2 * | 7/2015 | Scheibe | F16K 31/52 |
| 10,288,187 | B2 * | 5/2019 | Vogt | F16K 31/0679 |
| 11,326,705 | B2 * | 5/2022 | Bühler | F16K 27/0263 |
| 2009/0260700 | A1 * | 10/2009 | Meinhof | F16K 11/105 137/625 |
| 2010/0043738 | A1 | 2/2010 | Grandvallet et al. | |
| 2017/0314699 | A1 | 11/2017 | Vogt et al. | |

(Continued)

FOREIGN PATENT DOCUMENTS

DE 10 2013 206 971 A1 10/2014
DE 10 2019 212 062 A1 2/2021
(Continued)

Primary Examiner — Umashankar Venkatesan
(74) Attorney, Agent, or Firm — Hoffmann & Baron, LLP

(57) ABSTRACT

A membrane valve, with a valve housing, in which a housing interior is formed, in which housing interior a flexible control membrane is arranged. A drive plunger lies opposite a valve seat and the drive plunger has a shank body with a peripheral outer lateral surface. The outer lateral surface of the shank body of the drive plunger at least in the region of a guide section has a polygonally contoured prismatic shaping with a succession of outer side edges and outer side surfaces, wherein the edges and surfaces extend in the plunger longitudinal direction and the succession alternates in the circumferential direction of the drive plunger.

21 Claims, 3 Drawing Sheets

(56) References Cited

U.S. PATENT DOCUMENTS

| | | | |
|---|---|---|---|
| 2018/0313460 A1* | 11/2018 | Tsuchizawa | F16K 31/0655 |
| 2019/0353272 A1* | 11/2019 | Grandvallet | F16K 31/10 |
| 2021/0048116 A1 | 2/2021 | Bühler | |
| 2021/0396321 A1* | 12/2021 | Spittelmeister | F16K 11/0525 |
| 2022/0252178 A1* | 8/2022 | Vogt | F16K 31/10 |

FOREIGN PATENT DOCUMENTS

| | | |
|---|---|---|
| EP | 3 239 572 A1 | 11/2017 |
| WO | 87/04850 A1 | 8/1987 |
| WO | 2013/135366 A1 | 9/2013 |

* cited by examiner

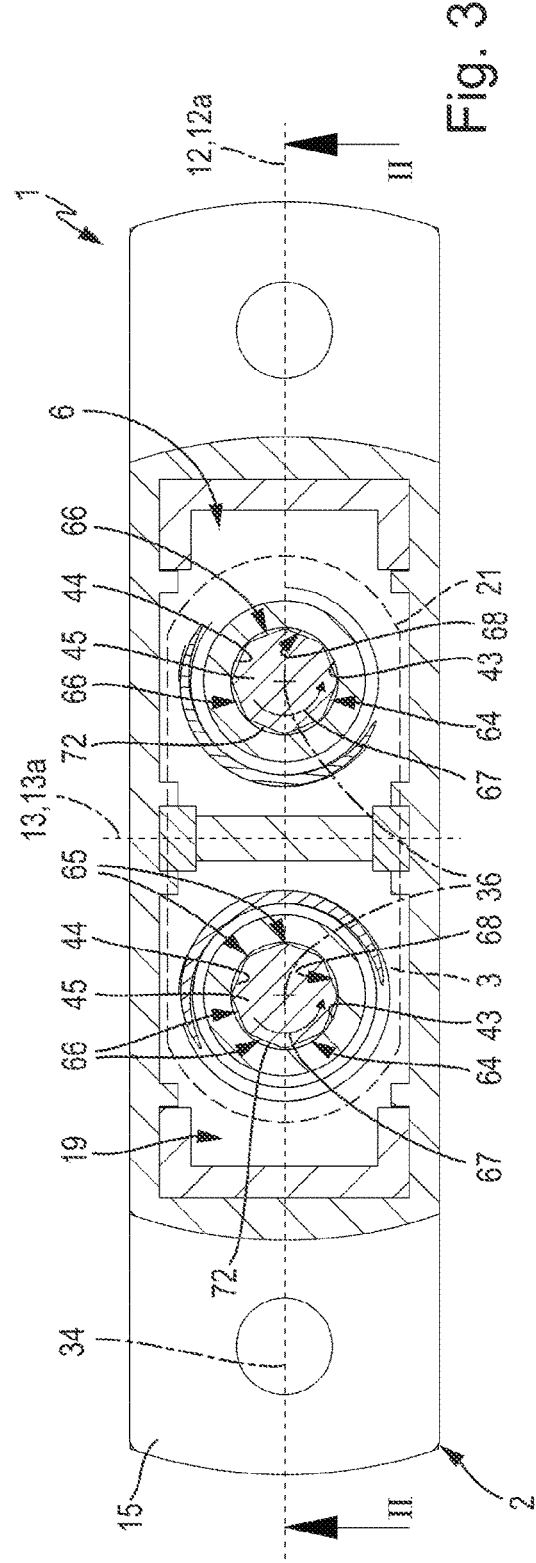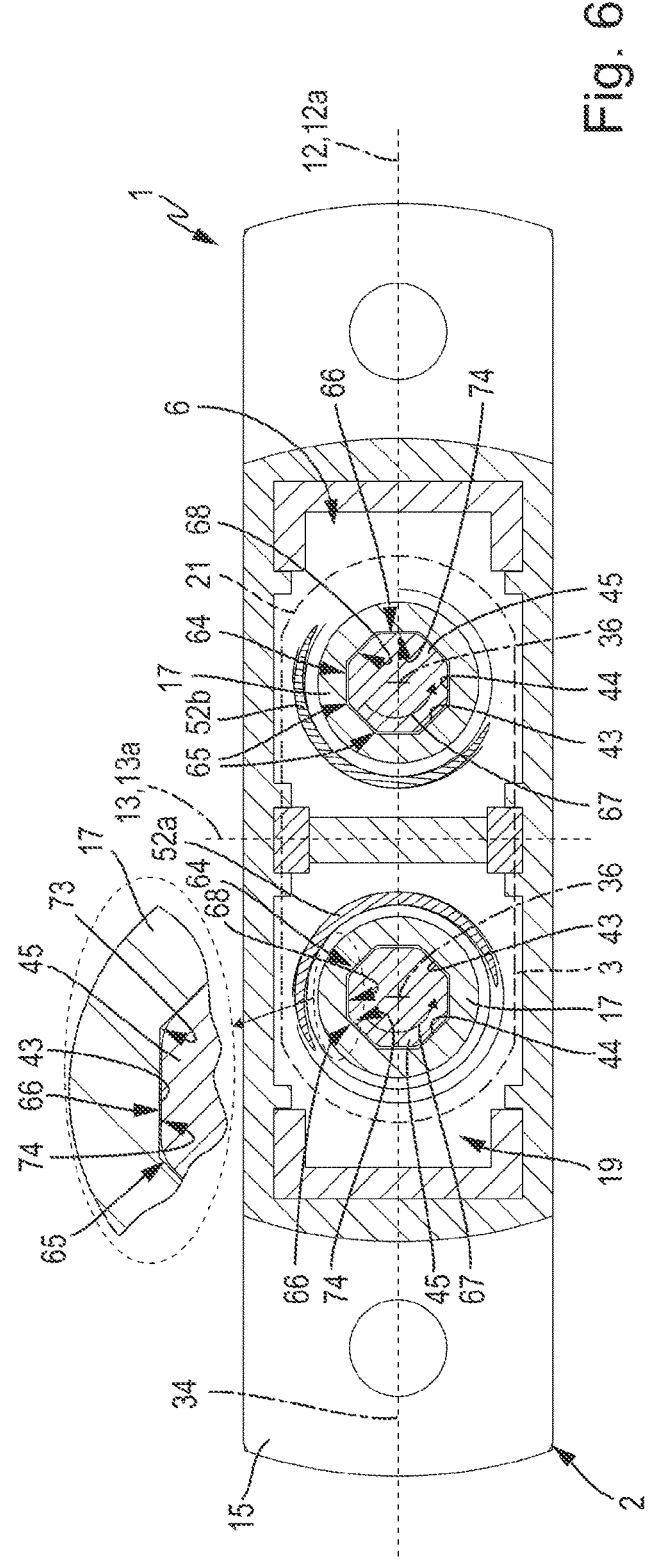

MEMBRANE VALVE

BACKGROUND OF THE INVENTION

The invention relates to a membrane valve, with a valve housing, in which a housing interior is formed, in which housing interior a flexible control membrane is arranged, said control membrane together with a base wall of the valve housing which lies opposite it in a height direction of the valve housing delimiting a control chamber which communicates with several valve channels, wherein at least one controllable valve channel of the several valve channels which runs into the control chamber and whose channel run-out in the control chamber is framed by a valve seat passes through the base wall, wherein a drive plunger lies opposite the valve seat of each controllable valve channel at the side of the control membrane which is away from the base wall in the height direction, said drive plunger comprising a shank body with a peripheral outer lateral surface, said shank body extending in a plunger longitudinal direction and with a guide section being linearly displaceably guided in the height direction in a guide recess of the valve housing which is delimited by an inner lateral surface, wherein each drive plunger can be driven by way of a drive device into a drive travel movement which is to and fro in the height direction of the valve housing, by which means a closure section of the control membrane which is arranged between a front end-face of the shank body which faces the base wall and the opposite valve seat of a controllable valve channel is selectively movable into a closure position which is pressed upon the assigned valve seat or into an open position which is lifted from this valve seat.

A membrane valve of this type which is known from DE 2019 212 062 A1 comprises a flexible control membrane which in a valve housing delimits a control chamber, into which several valve channels run, wherein two of these valve channels are designed as controllable valve channels which are framed by a valve seat, opposite which a closure section of the control membrane lies. Each closure section by way of the action of a drive plunger which executes a linear drive travel movement is selectively movable into a closure position which is pressed on the assigned valve seat or into an open position which is lifted from this valve seat. An individual drive plunger is assigned to each closure section, said drive plunger comprising a shank body which extends along a plunger longitudinal direction, is aligned parallel to a height direction of the valve housing and with a circularly cylindrical guide section is linearly displaceably guided in a likewise circularly cylindrical guide recess of the valve housing. Due to the back-action of the control membrane upon the drive plunger, asymmetrically distributed transverse forces could occur between the guide section and the guide recess, which compromise the drive travel movement and can lead to an increased wear.

Several construction forms of membrane valves which are either provided with two drive plungers or with only a single drive plunger are known from WO 2013/135366 A1. Here too, each drive plunger via a linearly guided shank body cooperates with a closure section of a control membrane which is to be moved.

EP 3 239 572 A1 describes a membrane valve with a control membrane, on which two drive plungers which are coupled in movement via a pivoting lever are fastened.

US 2010/0043738 A1 discloses a membrane valve, concerning which two plungers engage on a control membrane, said plungers being coupled to one another via a parallelogram-like lever structure.

SUMMARY OF THE INVENTION

It is the object of the invention, with regard to a membrane valve, to take measures which given a reduced wearing ensure an exact guidance of the at least one drive plunger.

For achieving this object, concerning a membrane valve in combination with the initially mentioned features, one envisages the outer lateral surface of the shank body of the drive plunger at least in the region of the guide section comprising a polygonally contoured prismatic shaping with a succession of outer side edges and outer side surfaces, said edges and surfaces extending in the plunger longitudinal direction and said succession alternating in the circumferential direction of the drive plunger.

In this manner, a membrane valve is present, said membrane valve comprising at least one drive plunger which by way of a drive device which is preferably designed as a constituent of the membrane valve can be driven into a drive travel movement in the height direction of the valve housing which coincides with the plunger longitudinal direction, in order to displace a closure section of the control membrane which is arranged in front of a shank body of the drive plunger, relative to an opposite valve seat and by way of this to position it selectively in a closure position bearing on the valve seat or in an open position lifted from the valve seat. In the closure position, the controllable valve channel which is assigned to the vale seat is closed, so that a flow exchange between the controllable valve channel and the control chamber which is possible in the open position of the closure section is prevented. Given its drive travel movement, the drive plunger is linearly displaceably guided relative to the valve housing and herein is supported at right angles to the height direction of the valve housing. This linear guidance takes place due to the interaction of a length section of the shank body of the drive plunger which is denoted as a guide section, with a guide recess which is stationary with respect to the valve housing and in which the drive plunger extends with its shank body. The guide section expediently extends only over a part-length of the shank body, but can also extend past the entire length of the shank body. A particularity lies in the fact that the outer lateral surface of the shank body which extends around a plunger longitudinal axis which defines the plunger longitudinal direction, at least in the region of the guide section which cooperates with the guide recess has a prismatic shaping and is accordingly contoured in a polygonal or polygon-shaped manner. This shaping is manifested in a succession of outer side edges and outer side surfaces of the outer lateral surface in the circumferential direction of the drive plunger, said edges and surfaces extending in the plunger longitudinal direction. As has been found, a guide section which is designed in such a manner is reliably and exactly supported by the inner lateral surface of the assigned guide recess which encompasses it, independently of the transverse forces which occur on operation, from which a uniform and low-wear drive travel movement results. Due to a shaping of the inner lateral surface of the guide recess which is matched to the prismatic outer contour of the guide section, on manufacture of the membrane valve one can influence the desired supporting effect in a very simple manner, which permits an inexpensive adaptation of the membrane valve to the expected application conditions. Particularly advantageous shapes for the inner lateral surface or the cross section of the guide recess lie in a cylindrical shape and alternatively in a polygon shape.

Advantageous further developments of the invention are to be derived from the dependent claims.

The outer side edges of the outer lateral surface are preferably convexly rounded in the region of the prismatic guide section of the shank body. By way of this, depending on the cross-sectional contour of the guide recess, one can succeed in the outer side edges either not bearing at all on the inner lateral surface of the guide recess or with a narrow surface contact and thus with a surface pressing which is reduced compared to a linear contact, and accordingly with a reduced wear.

Concerning a preferred embodiment of the membrane valve, the inner lateral surface of the guide recess is shaped cylindrically, wherein it is usefully shaped in a circularly cylindrical manner. The prismatic guide section of the shank body of the assigned drive plunger herein bears on the inner lateral surface of the guide recess in a slidingly displaceable manner only with its outer side edges which are expediently rounded, whereas an intermediate space without a mutual contact is present between the several outer side surfaces of the guide section which each lie between two side edges, and the cylindrical inner lateral surface of the guide recess. The linear guidance here results finally from the contact between the several outer side edges of the guide section and the cylindrical inner lateral surface of the guide recess. Several outer side edges always bear on the inner lateral surface of the guide recess, the number of which being dependent on the number of corners of the polygon-shaped profiling of the guide section. In this manner a very good supporting effect results, even in cases in which a tilting moment acts upon the drive plunger, for example caused by the assigned control membrane or the drive device.

Concerning an alternative embodiment of the membrane valve which is likewise seen as being particularly advantageous, the inner lateral surface of the guide recess has a polygonally contoured prismatic shaping, wherein inner side edges and inner side surfaces of the inner lateral surface which each extend in the circumferential height direction of the valve housing alternate in the circumferential direction of the guide recess, thus around the shank body of the drive plunger. In this manner, the guide section as well as the guide recess is shaped prismatically, wherein the cross sections are matched to one another such that the inner and outer side surfaces of the inner lateral surface and of the outer lateral surface each bear on one another in pairs in a slidingly displaceable manner. In this manner, an extensive support can be realised for a certain tilting direction of the drive plunger by way of non-bent inner and outer side surfaces which bear on one another. Furthermore, concerning this embodiment, one has the advantageous possibility of individually adapting a desired movement play transversely to the plunger longitudinal direction, in order for example to be able to easily compensate differently large tolerances in different components of the membrane valve. A further important aspect of the prismatic shape of the guide recess lies in a rotation lock of the drive plunger in the guide recess, which counteracts unfavourable loading of the control membrane even if this is fastened to the shank body of the drive plunger in the region of its closure section. The advantages which are entailed by the prevention of a rotation of the drive plunger are particularly pronounced in cases in which the control membrane is fixed to the valve housing in a non-concentric manner to the outer lateral surface of the shank body.

The inner side edges of the guide recess which face the shank body of the drive plunger are expediently not rounded, which in combination with rounded outer side edge of the guide section provides the advantage that an air gap which prevents a contact and accordingly a wearing remains between the inner and outer side edges.

Preferably, given a prismatic design of the guide section and of the assigned guide recess, the cross-sections of the guide section and of the guide recess are shaped congruently to one another at least in the region of the inner side surfaces and the outer side surfaces. The congruency can indeed also relate to the inner and outer side edges, but as already mentioned here, it is advantageous if the outer side edges are rounded and the inner side edges are non-rounded.

It has been found to be expedient if the guide section of the shank body has at least four outer side edges, thus is contoured at least in a rectangular manner. An octagonal outer contour with in total eight outer side edges is seen as being particularly advantageous. The same number of corners or side edges expediently accordingly applies to the inner lateral surface of the guide recess in the case of a guide recess which has a polygon-shaped cross section.

Basically, it is possible to realise the guide section of the shank body with an irregular polygon cross section. However, the design of the guide section as a regular prism with a regular polygon as a cross-section area is seen as being significantly more advantageous. The same applies to the inner contour of the guide recess which is adapted to the outer lateral surface of the guide section for achieving the desired supporting effect.

Concerning a favourable embodiment of the membrane valve, a wall of the valve housing extends on the side of the control membrane which is away from the base wall in the height direction of the valve housing, said wall being denoted as a guide wall due to its guiding function and through which at least one wall opening passes in the height direction of the valve housing, said wall opening forming a guide recess, through which a drive plunger extends with its shank body. The wall opening can be designed such that it forms a guide recess beyond its entire length or such that the guide recess only occupies a part-length of the wall opening. For example, a length section of the wall opening which connects onto the guide recess can have a cross section which is larger in comparison to the guide recess and have no contact to the shank body.

It is seen as being favourable if the outer lateral surface of the shank body is stepped in the plunger longitudinal direction with a ring step which extends annularly around a plunger longitudinal axis which defines the plunger longitudinal direction. Preferably, the outer lateral surface has only a single such step. The ring step separates the guide section which is transversely supported by the guide recess from a front length section of the shank body which connects thereto in the direction of the front end-face of the shank body, and whose cross sectional area is smaller than that of the guide section. In this manner, the possible guide contact between the drive plunger and the valve housing can be defined in a very exact manner. Furthermore, a design matching is possible to the extent that given the drive travel movement, at no time does the guide section travel over the end of the guide recess which faces the control membrane and in whose region the valve housing possibly has a burr which is inherent of manufacture and which could damage the outer lateral surface of the guide section.

In the aforementioned context, it is expedient if the wall opening of the guide wall comprises a lower opening end section which connects onto the guide recess in the direction of the base wall and which gradually widens in the direction of the base wall, in particular with a conical widening, wherein the ring step of the shank body which defines the front end of the guide section is always located within the guide recess independently of the travel position of the drive plunger.

Preferably, the outer lateral surface of the shank body does not merge directly into the front end-face of the shank body which faces the control membrane, but by way of a transition surface of a front shank body end section which tapers conically to the front. In this manner, the control membrane given its deformation can snuggle on the front shank body end section without the danger of damage. The transition between the conical transition surface and the front end-face of the shank body is preferably rounded.

A simple and inexpensively manufacturable drive plunger comprises a shank body whose outer lateral surface has a polygonally contoured prismatic shaping over its entire length. However, deviating from this, there is also indeed the possibility of designing the outer lateral surface of the shank body in a prismatic manner only in the region of a guide section which is designed shorter than the entire length of the shank body and to provide a front length section of the shank body which connects thereto with a cylindrical shaping which sets a round outer contour.

At its rear end region which is opposite the front end face of the shank body, at least one and preferably each drive plunger expediently comprises a radially projecting annular support section, on which a restoring spring is supported, said restoring spring furthermore yet also being supported on the valve housing, so that the drive plunger is biased into one of two travel end positions, concerning which these are the initially mentioned closure position or open position. Preferably, each drive plunger is resiliently biased into its open position.

Given an expedient embodiment, the valve housing delimits a drive chamber, in which the drive device of the membrane valve interacts with one or each drive plunger, in order to create its drive travel movement.

The guide wall which has already been mentioned further above and through which at least one drive plunger passes, with respect to the height direction of the valve housing is expediently arranged between the drive chamber and a membrane receiving chamber which receives the control membrane. The membrane receiving chamber is subdivided by the control membrane into the control chamber which communicates with the several valve channels and into a force transmission chamber which faces the guide wall. The force transmission chamber is a part-space of the membrane receiving chamber, in which the force-transmitting coupling between the at least one drive plunger and the control membrane takes place.

Expediently, the control membrane is fixedly connected to the assigned drive plunger in the force transmission chamber, for example by way of an adhesive connection and/or with a positive fit, the latter in particular by way of a latching or snap connection. By way of this, pushing forces as well as pulling forces can be exerted by the drive plunger onto the closure section of the control membrane. Alternatively, a force-transmitting coupling is also possible, concerning which the control membrane with its closure section only loosely bears on the front end-face of the shank body, so that this section can only act upon the closure section in a pushing but not pulling manner. However, a fixed connection which permits a pushing as well as a pulling force transmission from the drive plunger onto the deformation section of the control membrane, in particular if the fluid to be controlled can be under a vacuum, is preferred.

The valve housing is expediently designed in a multi-part manner, wherein it comprises a first housing part which forms the base wall and a second housing part which forms the guide wall, wherein the control membrane at its outer edge is sealingly clamped all around between the two housing parts.

A possible embodiment of the membrane valve according to the invention has only a single drive plunger and also only a single controllable valve channel. In this case, at least one further, non-controllable valve channel runs out into the control chamber, said valve channel being in constant fluid connection with the control chamber and independently of whether the closure section of the control membrane is positioned in the open position or closure exposition, is fluid-connected through the control chamber to the controllable valve channel or is separated with respect to this. Such a membrane valve in particular has a 2/2 valve function.

A particularly advantageous embodiment of the membrane valve has two drive plungers which are arranged next to one another transversely to the height direction of the valve housing and which by way of a closure section of the control membrane which is each individually drivable by them are capable of releasing or closing two controllable valve channels for the fluid connection to the control chamber which run into the control chamber. Such a membrane valve expediently yet has at least one non-controllable valve channel which runs out into the control chamber in a constant open fluid connection. This non-controllable valve channel can then for example be alternately fluidically connected selectively to one of the two controllable valve channels.

Concerning such a membrane valve, two controllable valve channels which run into the control chamber at a distance to one another and whose channel run-outs in the control chamber are each framed by a valve seat pass through the base wall, wherein one of two drive plungers lies opposite each of the two valve seats at the side of the control membrane which is away from the base wall in the height direction of the valve housing. The two drive plungers are each guided in a linearly displaceable manner in one of two guide recesses of the valve housing which are arranged next to one another transversely to the height direction, and in the course of their drive travel movement can each selectively position one of two movable closure sections of the control membrane in a closure position which is pressed onto the valve seat of one of the two controllable valve channels or in an open position which is lifted from this valve seat.

Preferably, the drive device of a membrane valve which comprises two drive plungers is designed such that the two drive plungers always execute their drive movements in opposite directions, so that the respective one closure section assumes a closure position when the other closure section is positioned in the open position. In order to realise such kinematics in a particularly simple manner, it is expedient if the drive device comprises a rocker switch which whilst executing a switching movement is pivotable to and fro relative to the valve housing about a pivot axis which is orthogonal to the height direction of the valve housing and which comprises two rocker arms which for creating the working movements of the two drive plungers each interact with a rear end-face of one the two drive plungers which is away from the control membrane.

An actuation unit of the drive device, by way of which the drive travel movement of each drive plunger can be created, is situated at an upper side of the valve housing which is orientated in the height direction and which is away from the base wall. Concerning the actuation unit, this in particular is an electromagnet unit. Concerning a drive device which is provided with a rocker switch, the actuation unit expediently cooperates with the rocker switch.

BRIEF DESCRIPTION OF THE DRAWINGS

The invention is hereinafter explained in more detail by way of the accompanying drawing. In these are shown.

DETAILED DESCRIPTION

The membrane valve 1 which is illustrated in different embodiments has a valve housing 2 with a height axis 8 which extends in a height direction 8a and which simultaneously defines a height axis of the complete membrane valve 1.

Figure 2:
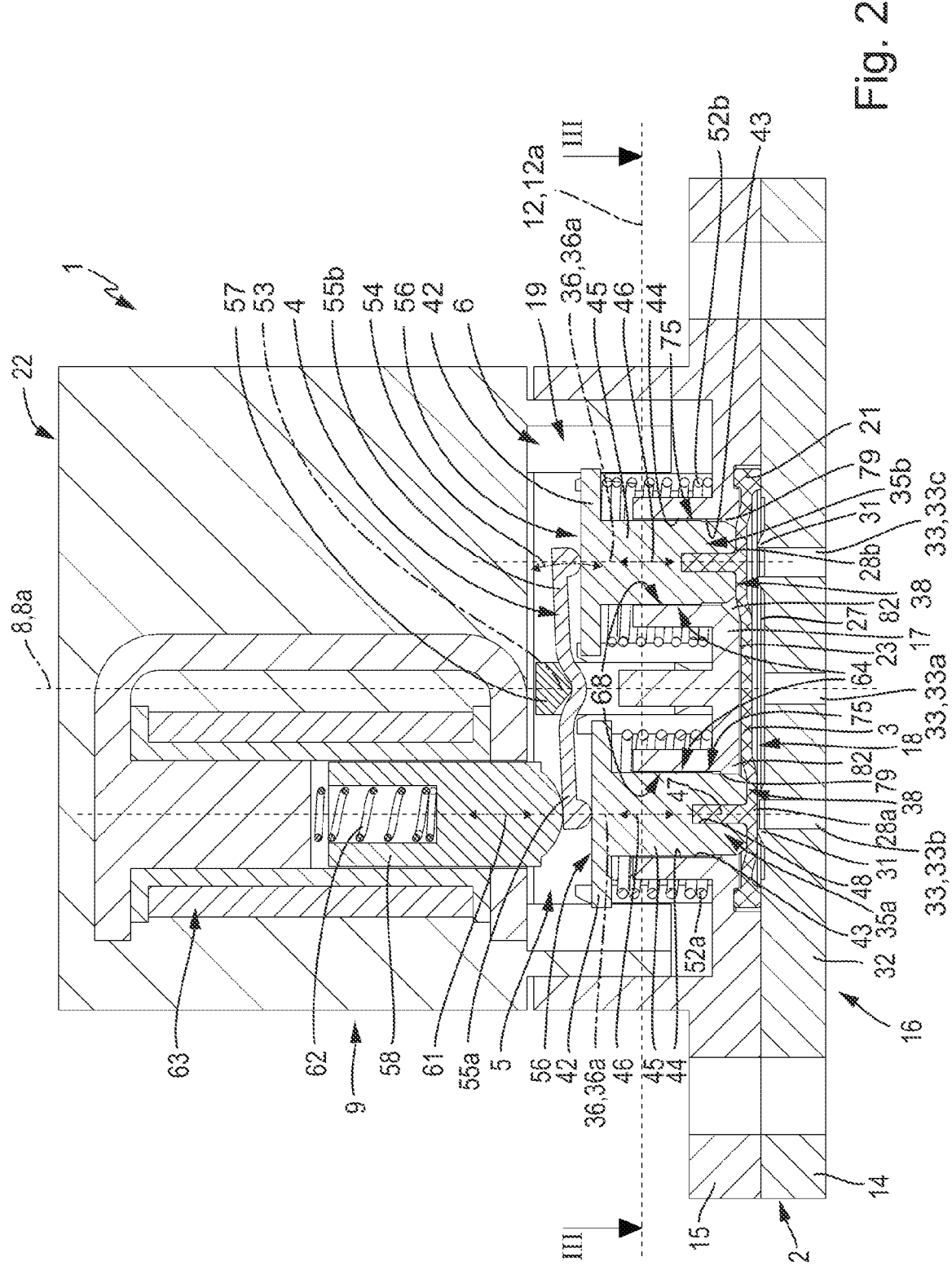

The membrane valve 1 furthermore has a longitudinal axis 12 which is at right angles to the height axis 8 and which extends in a longitudinal direction 12a, as well as a transverse axis 13 which is at right angles to the height axis 8 and to the longitudinal axis 12 and extends in a transverse direction 13a. The longitudinal section which is illustrated in FIG. 2 extends in a plane which is spanned by the height axis 8 and the longitudinal axis 12, whereas the transverse sections of FIGS. 3 and 4 extend in a plane which is spaced by the longitudinal axis 12 and the transverse axis 13.

The valve housing 2 preferably has a multi-part construction. By way of example, it comprises a first housing part 14 which is arranged on a lower side 16 of the membrane valve 1 and can therefore be denoted as a housing lower part, and furthermore has a second housing part 15 which connects onto the first housing part 14 at the top in the height direction 8a and is fixedly connected to the first housing part 14 in a manner which is not illustrated further, for example by a welding connection or a screw connection.

The actuation unit 9 of a drive device which in its entirety is denoted with the reference numeral 5 is located at an upper side 22 of the membrane valve 1. The actuation unit 9 is fastened to the second housing part 15. Together, the two housing parts 14, 15 and the actuation unit 9 delimit a housing interior which is formed in the valve housing 2.

The housing interior 2 is divided in the height direction 8a by an intermediate wall of the valve housing 2 which hereinafter is denoted as a guide wall 17 on account of its function which is yet to be explained, and specifically into a membrane receiving chamber 18 which is assigned to the lower side 16 and into a drive chamber 19 which is assigned to the upper side 22. The guide wall 17 is preferably a single-piece constituent of the second housing part 15. The drive chamber 19 in the region of the upper side 22 is preferably closed by the actuation unit 9 which is attached to the second housing part 15.

A control membrane 3 is arranged in the membrane receiving chamber, said control membrane in the non-deformed state extending at least essentially in a plane which is to be denoted as a membrane plane and extends at right angles to the height axis 8. Concerning the control membrane 3, it is a flexible membrane which preferably consists of a material with rubber-elastic characteristics, in particular of an elastomer material. Regions which are prone to wearing can be provided with reinforcement measures when necessary. At its outer edge 21, the control membrane 3 which as a whole is designed in a fluid-impermeable manner is fixedly clamped all around between the two housing parts 14, 15 amid sealing, so that it subdivides the membrane receiving chamber 18 in a fluid tight manner into a control chamber 27 which is assigned to the lower side 16 and into a further chamber which is assigned to the upper side and is hereinafter denoted as a force transmission chamber 23.

The control chamber 27 is commonly delimited by the control membrane 3 and a wall section of the first housing part 14 which is covered by the control membrane 3 and which is hereinafter denoted as a base wall 32 of the valve housing 2. Expediently, the control membrane 3 extends in the region which is framed by its outer edge 21, at a slight height distance to the base wall 32.

The force transmission chamber 23 is commonly delimited by the control membrane 3 and the already mentioned guide wall 17 which lies opposite the base wall 32 at a height distance which is measured in the height direction 8a.

Several valve channels 33 which each at one end with inner channel run-outs run into the control chamber 27 and at the other end with outer channel run-outs run out at the outer side of the first housing part 14 pass through the base wall 32. Fluid channels which lead further and which for example are formed in fluid hoses or in other components and through which a fluid to be controlled by the membrane valve 1 can be fed and discharged can be connected onto the outer channel run-outs of the valve channels 33. The fluid to be controlled can be at underpressure or overpressure.

By way of example, as a whole three valve channels 33 are present, concerning which these are a non-controllable or uncontrolled valve channels 33a and two controllable valve channels 33b, 33c, wherein the latter are hereinafter also denoted as the first and second controllable valve channel 33b, 33c for a mutual differentiation. The non-controlled valve channel 33a is in constantly open fluid connection with the control chamber 27. The two controllable valve channels 33b, 33c can each selectively be open for a fluid passage or closed for the prevention of a fluid passage, depending on the deformation state of the control membrane 3.

The inner channel run-outs of the two controllable valve channels 33b, 33c are each framed by an annular valve seat 31 which is formed in the control chamber 27 on the base wall 32. Preferably, the valve seats 31 are raised and herein are designed projecting in the direction of the control membrane 3.

One of two membrane sections of the control membrane which are delimited with regard to surface lies opposite each valve seat 31 in the height direction 2 and these are hereinafter denoted as the first and second closure section 28a, 28b, The first closure section 28a is assigned to the valve seat 31 of the first controllable valve channel 33b, the second closure section 28b to the valve seat 31 of the second controllable valve channel 33c.

Each closure section 28a, 28b can be pressed onto the assigned valve seat 31 for assuming closure position, so that it interrupts the fluid connection between the control channel 27 and the assigned first or second controllable valve channel 33b, 33c. Furthermore, each closure section 28a, 28b can be positioned in at least one open position which is lifted from the assigned valve seat 31, so that an open fluid connection is present between the control chamber 27 and the assigned first or second controllable valve channel 33b, 33c Concerning the illustrated embodiment example, the drive device 5 is designed such that a mechanical positive coupling exists between the closure sections 28a, 28b and always when one of the closure sections 28a, 28b is positioned in it closure position, the respective other closure section 28b, 28a assumes an open position.

In this manner, a fluid passage between the non-controlled valve channel 33a and either the first controllable valve channel 33b or the second controllable valve channel 33c is alternately possible through the control chamber 27.

The valve seats 31 of the two controllable valve channels 33b, 33c are expediently arranged at a distance to one another in the longitudinal direction 12a, so that their middle points are intersected by a main plane 34 which is spanned by the longitudinal axis 12 and the height axis 8. The inner channel run-out of the non-controlled valve channel 33a is expediently located therebetween.

The movements which are carried out by the closure sections 28a, 28b on dislocating between the open position and the closure position are hereinafter denoted as control movements and are orientated in the height direction 8a. Concerning the control movements, an elastic deformation of the control membrane 3 in particular in the transition region between the closure sections 28a, 28b and the membrane sections which frame the closure sections 28a, 28b takes place.

One of two drive plungers 35a, 35b of the membrane valve 1 is assigned to each closure section 28, 28b for creating the assigned control movement. The drive plunger 35a which is assigned to the first closure section 28a is hereinafter also denoted as the first drive plunger 35a and the drive plunger 35b which is assigned to the second closure section 28b also as a second drive plunger 35b.

Each drive plunger 35a, 35b lies opposite one of the two valve seats 31 at the side of the control membrane 3 which is away from the base wall 32 in the height direction 8a.

Each drive plunger 35a, 35b has a plunger longitudinal axis 36 which extends in a plunger longitudinal direction 36a, extends in the height direction 8a and is consequently parallel to the height axis 8.

Each drive plunger 35a, 35b has a shank body 37 which extends in the plunger longitudinal direction 36a with a front end-face 38 which faces one of the control membranes 3. Each drive plunger 35a, 35b can consist exclusively of the shank body 3, but expediently at its rear end region which is opposite to the front end-face 38 comprises an annular support section 42 which is coaxial to the plunger longitudinal axis 36, projects radially with respect to the shank body 37 and whose function is explained further below.

The guide wall 17 is in its regions which lie opposite the two valve seats 31 in the height direction 8a is passed through by a wall opening 43 which passes through in the height direction 8a. Each drive plunger 35a, 35b extends through one of the two wall openings 43.

A longitudinal section of each wall opening 43 is designed as a guide recess 44, in which the assigned drive plunger 35a, 35b extends with a length section of its shank body 37 which is designed as a guide section 45. By way of the interaction of the guide section 45 with the guide recess 44, the shank body 37 and consequently the complete drive plunger 35a, 35b is guided in a linearly displaceable manner relative to the valve housing 2 in the height direction 8a, so that in the height direction 8a it can execute a drive travel movement 46 which is indicted by a double arrow and concerning which it approaches the base wall 32 or distances itself from the base wall 32 depending on the movement direction. The drive travel movement 46 is a purely linear movement since the shank body 37 on its guide section 45 is supported by the guide recess 44 in a transverse manner at all sides in a plane which is at right angles to the height axis 8.

The drive travel movement 46 of the two drive plungers 35a, 35b can be created by way of the drive device 5. For this, the drive device 5 by way of example interacts with the two drive plungers 35a with regard to drive, in the drive chamber 19.

The control movement of the closure section 28a, 28b which is assigned to the respective drive plunger 35a, 35b results from the drive movement 6 of each drive plunger 35a, 35b. Expediently, for this purpose each drive plunger 35a, 35b is coupled in a force-transmitting manner to the closure section 28a, 28b which is assigned to it, in the force transmission chamber 23 which has already been mentioned further above.

The force-transmitting coupling is preferred and according to the embodiment example realised such that the drive plunger 35a, 35b can exert pushing forces in the direction of the opposite valve seat 31 as well as pulling forces directed away from the opposite valve seat 31 in the height direction 8a, upon the respectively assigned closure section 28a, 28b. By way of example, the control membrane 3 on each closure section 28a, 28b has a fastening continuation 47 which is integrally formed as one piece on its rear side which faces the adjacent drive plunger 35a, 35b, said fastening continuation projecting in the direction of the upper side 22, engaging into a fastening recess 48 which runs out to the front end-face 38 of the shank body 37 and being fixed in this. Concerning the illustrated embodiment example, the fastening continuation 47 is pressed and/or bonded into the fastening recess 48. Concerning an embodiment example which is not illustrated, the fastening continuation 47 is positively fixed in the fastening recess 48, in particular by a latching connection or a snap connection.

If the movement direction of the drive travel movement 46 of a drive plunger 35a, 35b is directed to the valve seat 31 which lies opposite it, then the shank body 37 pushes the closure section 28a, 28b which is arranged in front of it, in front of it by way of its front end-face 38 and finally presses it onto the valve seat 31 whilst assuming the closure position. The drive plunger 35a, 35b has then reached a first travel end position. Given the opposite movement direction of the drive travel movement 46, the drive plunger 35a, 35b pulls the closure section 28a, 28b which is fixed to it away from the opposite valve seat 31 into an open position. A maximal open position is present when the closure section 28a, 28b assumes a maximal height distance to the valve seat 31. In the maximal open position of the closure section 28a, 28b, the drive plunger 35a, 35b is situated in a second travel end position.

Expediently, each drive plunger 35a, 35b is resiliently biased into the second travel end position. By way of example, for this a first restoring spring 52a which is designed as a compression spring is assigned to the first drive plunger 35a and a second restoring spring 52b which is likewise designed as a compression spring is assigned to the second drive plunger 35b. Each restoring spring 52a, 52b, concerning which it is particularly the case of a helical compression spring, by way of example is arranged coaxially around the shank body 37, wherein with its one end it is supported on the support section 42 and with its other end is supported on the guide wall 17.

The two drive plungers 35a, 35b are expediently kinematically coupled by the drive device 5 in a manner such that they always execute their drive movements 46 in opposite directions. In order to obtain this functionality, it is advantageous if the drive device 5 according to the illustrated embodiment example comprises a rocker switch 4 which is arranged in the drive chamber 19 and which with respect to the valve housing 2 is mounted in a pivotable manner about a pivot axis 53 which is orthogonal to the height axis 8 and in particular to the main plane 34. The pivoting movement which is indicated in the drawing by a double arrow is hereinafter denoted as a switch-over movement 54. The switch-over movement 54 is an alternating pivoting movement which takes place alternately in the clockwise direction and in the anticlockwise direction.

The rocker switch 4 has two first and second rocker arms 55a, 55b which with respect to the pivot axis 34 project in different and preferably opposite directions. The pivot axis 53 extends in a region which in the longitudinal direction 12a lies between the two drive plungers 35a, 35b, wherein each rocker arm 55a, 55b coming from the pivot axis 53 extends in the direction of the respective one of the two drive plungers 35a, 35b and specifically into a region which is arranged in front at the rear side of the respective drive plunger 35a, 35b, thus towards the upper side. The respectively assigned rocker arm 55a, 55b bears on a rear end-face 56 of the drive plunger 35a, 35b which is located there, opposite the front end-face 38.

The pivot axis 53 is realised for example by way of a bearing web 57 which extends in the drive chamber 19 in the transverse direction 13 and at whose side which faces the lower side 16 the rocker switch 4 bears from below, wherein by way of example it is constantly pressed onto the bearing web 57 by the two restoring springs 52a, 52b.

The switch-over movement 54 of the rocker switch 4 can preferably be created by an actuation member 58 of the actuation unit 9 which is movable in the height direction 8a and which can be driven into an actuation movement 61 which is to and fro and which is indicated by a double arrow and concerning which by way of example it is a linear movement which is parallel to the height axis 8.

The actuation member 58 which in particular is designed in a plunger-like manner connects onto the first drive plunger 35a to the top at a distance in a preferably coaxial alignment in the height direction 8a, wherein it bears on the first rocker arm 55a from the upper side which is opposite to the first drive plunger 35a in the height direction, and is expediently biased downwards against the first rocker arm 55a by way of an actuation spring 62 of the actuation unit.

An electrically controllable actuation structure 63 of the actuation unit 9, concerning which it is preferably an electromagnet, given a suitable control can exert a force upon the actuation membrane 58, said force displacing the actuation member 58 in a manner directed upwards away from the first rocker arm 55a whilst overcoming the spring force of the actuation spring 62. As a whole, the actuation unit 9 is designed according to the illustrated embodiment example preferably as an electromagnet unit whose movable armature forms the actuation member 58.

The spring forces of the actuation spring 62 and of the second restoring spring 52a as a sum are larger than the spring force of the first restoring spring 52a whose spring force however is larger than the spring force of the second restoring spring 52b. In the electrically deactivated state of the actuation unit 9, the first drive plunger 35a is therefore pressed into the first travel end position, whereas simultaneously the second drive plunger 35b assumes the second travel end position. On activating the actuation unit 9, the actuation member 58 is displaced upwards amid the execution of an actuation movement 61, so that the actuation spring 62 is ineffective with respect to the rocker switch 4 and the latter carries out a switch-over movement 54 which leads to the first drive plunger 35a being displaced into the second travel end position and the second drive plunger 35 into the first travel end position.

With regard to the membrane valve 1, measures are implemented by way of which each drive plunger 35a, 35b undergoes an exact transverse support in the directions which are orthogonal to the height axis 8a given the drive travel movement 46 as well as in each travel position. Each drive plunger 35a, 35b is thus also supported in a very exact manner even with unfavourable external force influences and given the working travel movement 46 undergoes a precise linear guidance.

These support and guidance measures include the peripheral outer lateral surface 64 of the shank body 37 of each drive plunger 35a, 35b which is orientated radially outwards with respect to the plunger longitudinal axis 36 having a polygonally contoured prismatic shaping at least in the region of the guide section 48. This shaping is expressed in an succession of outer side edges 65 and outer side surfaces 66, said edges and surfaces extending in the plunger longitudinal direction 36 and said succession alternating in the circumferential direction 67 of the respective drive plunger 35a, 35b which is indicted by an arrow, thus in the direction around the middle plunger longitudinal axis 36. The guide section 45 has the shape of a straight prism, wherein the outer side surfaces 66 are designed as rectangular surfaces.

The guide recess 44 which by way of example is formed at least by a longitudinal section of a wall opening 43 of the guide wall 17 and through which the drive plunger 35a, 35b extends with its shank body 37, at the inside is delimited by a radially inwardly facing inner lateral surface 68 which likewise extends in the circumferential direction 67 about the plunger longitudinal axis 36. It is thus adapted to the outer lateral surface 64 of the guide section 45 such that the later all around either bears completely or only in sections on the inner lateral surface 68 in a slidingly displaceable manner.

Although it is not necessary, it is however indeed advantageous if the outer side edges 65 of the prismatic outer lateral surface 64 of the guide section 45 are convexly rounded, as is well evident in the enlarged detail representation of FIG. 6.

It is further advantageous and this being the case with all illustrated embodiment examples, if the prismatic outer lateral surface 64 is shaped according to a so-called regular prism which has a regular polygon-shaped cross section. In comparison to a basically otherwise possible shaping with an irregular polygon cross section, the regular polygon contour results in a very advantageous uniform transverse supporting of the shank body 37 with respect to the guide recess 44.

Preferably, the outer lateral surface 64 at least in the region of the guide section 65 has an at least rectangular profiling, thus with at least four corners and accordingly with at least four outer side ends 65 which result therefrom. This number of corners or side edges however can also be arbitrarily higher. A guide section 45 which has an octagonal outer contour and accordingly has the shape of a prism with in total eight outer side edges and eight outer side surfaces has been found to provide an optimal ratio between the achievable supporting effect and the occurring friction. The octagonal outer contour is realised with all embodiment examples.

Figure 1:
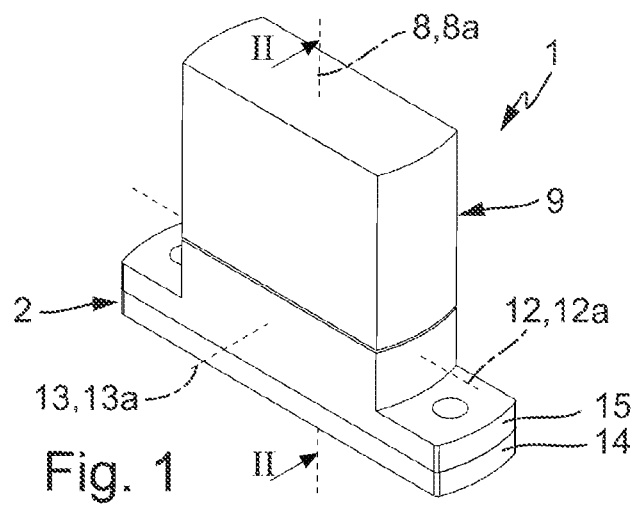
FIG. 1 an isometric representation of a membrane valve according to the invention, of a preferred construction, FIG. 2 the membrane valve of FIG. 1 in a longitudinal section according to section line II-II of FIGS. 1 and 3, FIG. 3 a cross section of the membrane valve in a section plane III-III of FIG. 2 which is at right angles to the height direction, FIG. 4 an individual representation of a drive plunger of the membrane valve of FIGS. 1 to 3 in a lateral view and with an enlarged detail, FIG. 5 an isometric representation of the drive plunger of FIG. 4, FIG. 6 a cross section analogously to the cross section of FIG. 3, through an alternative construction of the membrane valve, which differs from that of the FIGS. 1 to 5 only in the shaping of the inner lateral surface of the guide recess, FIG. 7 an alternative embodiment of a drive plunger in an individual representation in a lateral view analogously to FIG. 4, and FIG. 8 an isometric representation of the drive plunger of FIG. 7.

A guide recess 44 which is realised with the embodiment example of FIGS. 1 to 3 has a cylindrically shaped inner lateral surface 68, wherein it is preferably a circularly cylindrical shaping. The prismatic guide section 45 with this embodiment bears on the inner lateral surface 68 in a slidingly displaceable manner only with its outer side edges 65, whereas an intermediate space 72 which is well evident from FIG. 3 and in which the guide section 45 has no contact with the inner lateral surface 68 is present between the preferably plane, outer side surfaces 66 of the guide section 45 and the inner lateral surface 68 of the guide recess 44.

Concerning a membrane valve 1 with two drive plungers 35a, 35b, the two shank bodies 37 in combination with a circularly cylindrical guide section 45, with regard to the rotation angle are preferably aligned such that an outer side edge 65 of each guide section 45 faces the guide section 45 of the respective other shank body 37. These two outer side edges 65 expediently extend in the main plane 34 which is defined further above.

The prismatic shape of the guide section 45 expediently has an even number of outer side edges 65. Concerning the embodiment example of FIGS. 1 to 3, this results in two outer side edges 65 of each guide section 45 lying in the main plane 34.

Concerning a likewise very advantageous embodiment of the membrane valve which is based on FIG. 6, not only does the outer lateral surface 64 of each guide section 45, but also the inner lateral surface 68 of the respectively assigned guide recess 44 has a polygonally contoured prismatic shaping. Accordingly, the inner lateral surface 68 is composed of a succession of inner side edges 73 and inner side surfaces 74, said edges and surfaces extending in the height direction 8a and said succession alternating in the circumferential direction 67. Herein, expediently an inner side surface 74 of the inner lateral surface 68 of the guide recess 44 lies opposite each outer side surface 66 of the outer lateral surface 64 of the guide section 45, wherein the outer and inner side surfaces 66, 74 which each lie opposite one another in pairs bear on one another in a slidingly displaceable manner, so that given the drive travel movement 64, the shank body 37 with its outer side surfaces 66 can slide along on the inner side surfaces 74 of the guide recess 44.

The number of inner side edges 73 expediently corresponds to the number of outer side edges 65 and the number of the inner side surfaces 74 corresponds expediently to the number of outer side surfaces 66.

The polygon cross sections of the guide section 45 and of the guide recess 44 are preferably congruent to one another. The congruency herein relates at least to the regions of the outer and the inner side surfaces 66, 74, wherein it is advantageous if no or at least no exact congruency is present in the region of the outer and inner side edges 65, 73 which face one another, by way of only the outer side edges 65 being rounded, but not the inner side edges 73. By way of this, narrow intermediate spaces result between the outer lateral surface 64 and the inner lateral surface 68 between the outer and inner side edges 65, 73 which each lie opposite one another in pairs, by which means a wearing is minimised. Basically however, it is possible to also extend the congruency to the outer and inner side edges 65, 73 by way of the outer side edges 65 as well as the inner side edges 73 each being rounded or each being non-rounded.

Given a prismatic shaping of the guide section 45 as well as the guide recess 44, concerning a membrane valve 1 which has two drive plungers 35a, 35b, it is advantageous if a pair of outer and inner side surfaces 66, 74 is located at the sides which face one another in the longitudinal direction 12a, said side surfaces preferably each extending in a transverse plane which runs at right angles to the longitudinal axis 12.

Figure 4:
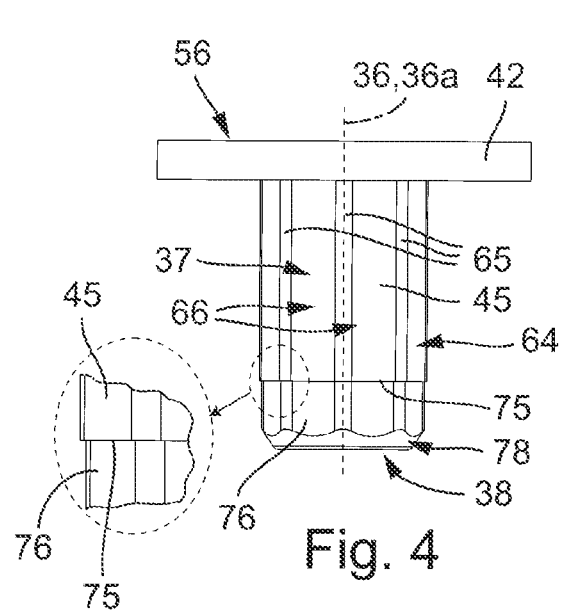
Figure 5:
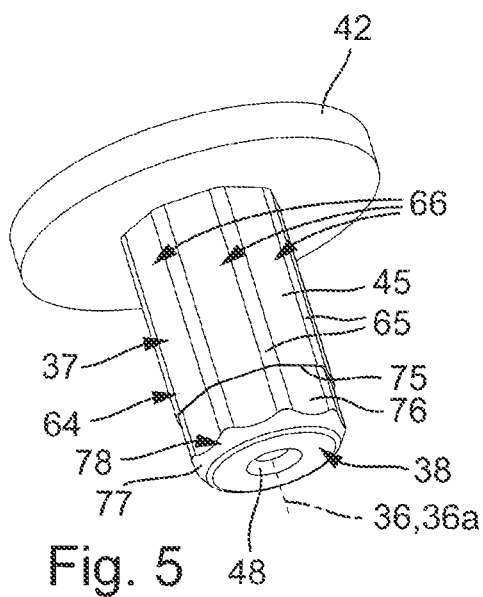

Concerning a particularly advantageous design shaping, which is evident from FIGS. 2, 4 and 5, the outer lateral surface of the shank body 37 of a respective drive plunger 35a, 35b is stepped in the plunger longitudinal direction 36a. The stepping is manifested in a ring step 75 which is concentric to the plunger longitudinal axis 36 and which is located at an axial distance to the front end-face 38. It defines the end which is at the front in the plunger longitudinal direction 36a, of the guide section 45 which coming from there extends in the direction of the rear end-face 56, is not being stepped over its length and has a constant cross section. At the front, a front length section 76 of the shank body 37 connects onto the ring step 75, said length section considered in a cross section at right angles to the plunger longitudinal axis 36 having a smaller cross-sectional area than the guide section 45.

Preferably, a front shank body end section 77 which belongs to the front length section 76 is designed tapering conically or in a cone-shaped manner towards the front end-face 38. In the region of this front shank body end section 77, the shank body 37 has a conical transition surface 78 which is arranged between the outer lateral surface 64 and the front end-face 38. An annular transition edge 79 between the conical transition surface 78 and the front end-face 38 is expediently rounded.

When the control membrane 3 is deformed by the fluid pressure of the fluid to be controlled, it can snuggle onto the conical transition surface 78 in a low-wearing manner all around the closure section 28a, 2b.

The fluid which is to be controlled is usually under a certain overpressure. This fluid can for example be pressurised air but also another pressurised gas or a liquid which is under overpressure. The fluid to be controlled however can also be under a vacuum.

The outer lateral surface 64 of the shank body 37 is expediently prismatically shaped over its entire length. Accordingly, concerning the illustrated embodiment example of FIGS. 2, 4 and 4, that length section of the outer lateral surface 64 which extends between the ring step 75 and the conical transition surface 78 also has a polygon-shaped outer contour, but with a smaller cross section in comparison to the guide section 45. Concerning an embodiment example which is not illustrated, this length section of the outer lateral surface 64 is shaped in a cylindrical and in particular circularly cylindrical manner.

A particular advantage of the stepping of the outer lateral surface 64 is manifested in combination with a wall opening 43 which according to the illustrated embodiment example has a lower opening end section 82 which connects onto the guide recess 44 in the direction of the base wall 32 and which widens in the direction of the base wall 32, wherein it is particular a conical widening. This widening lower opening end section 82 favours the elastic deformation of the control membrane 3 in the region of a membrane section which extends around a respective closure section 28a, 28b when the respective closure section 28a, 28b is moved into the open position. With regard to manufacturing technology, a small burr can hardly be avoided in the transition region between the lower opening end section 82 and the guide recess 44 if one were not to accept a high post-machining effort. Concerning the shank body 37, the ring step 75 is now placed such that it is always located within the guide recess 44 independently of the travel position of the drive plunger 35, 35b and consequently the guide section 45 at no time moves over the possibly sharp-edges transition region between the guide recess 44 and the lower opening ends-section 82. By way of this, damage of the guide section 45 or of the length section of the outer lateral surface 64 which is formed thereon is prevented.

Figure 7:
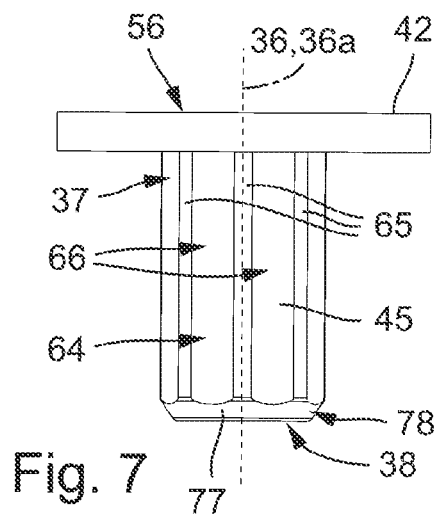
Figure 8:
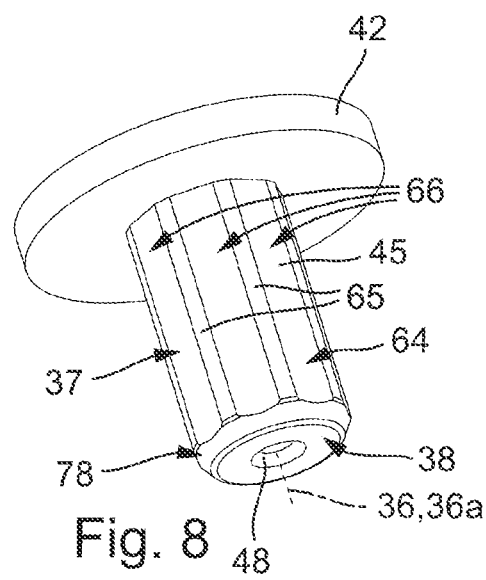

In particular, in cases in which the mentioned bur can be avoided or can be removed on manufacture, the shank body 37 can also be designed such that the prismatic outer lateral surface 64 is un-stepped over its entire length and the shank body 37, disregarding the optional front shank body end section 77, has a constant cross section over its entire length. Such a shaping is realised with the embodiment example of a drive plunger 35a, 35b which is illustrated in FIGS. 7 and 8.

Whereas the membrane valve 1 which is illustrated in several embodiment examples comprises two drive plungers 35a, 35b, given an alternative construction shape which is not illustrated, the membrane valve 1 is only provided with a single drive plunger and with only with a single controllable valve channel, wherein the control membrane 3 comprises only a single closure section which can be selectively positioned in an open position and in a closure position. The drive device 5 in this case is designed such that it only acts upon the single drive plunger. With regard to the design of a guide recess 44 and of a guide section 45, the above embodiments apply accordingly.

What is claimed is:

1. A membrane valve, with a valve housing, in which a housing interior is formed, in which housing interior a flexible control membrane is arranged, said control membrane together with a base wall of the valve housing which lies opposite it in a height direction of the valve housing delimiting a control chamber which communicates with several valve channels, wherein at least one controllable valve channel of the several valve channels which runs into the control chamber and whose channel run-out in the control chamber is framed by a valve seat passes through the base wall, wherein a drive plunger lies opposite the valve seat of each controllable valve channel at the side of the control membrane which is away from the base wall in the height direction, said drive plunger comprising a shank body with a peripheral outer lateral surface, said shank body extending in a plunger longitudinal direction and with a guide section being linearly displaceably guided in the height direction in a guide recess of the valve housing which is delimited by an inner lateral surface, wherein each drive plunger can be driven by way of a drive device into a drive travel movement which is to and fro in the height direction of the valve housing, by which means a closure section of the control membrane which is arranged between a front end-face of the shank body which faces the base wall, and the opposite valve seat of a controllable valve channel is selectively movable into a closure position which is pressed upon the assigned valve seat or into an open position which is lifted from this valve seat, and wherein the outer lateral surface of the shank body of the drive plunger at least in the region of the guide section comprises a polygonally contoured prismatic shaping with a succession of outer side edges and outer side surfaces, said edges and surfaces extending in the plunger longitudinal direction and said succession alternating in the circumferential direction of the drive plunger, and
   wherein the outer side edges of the prismatic guide section of the shank body of the drive plunger are convexly rounded, and
   wherein the outer side edges of the prismatic guide section of the shank body of the drive plunger are either not bearing at all on the inner lateral surface of the guide recess or bearing with a narrow surface contact.

2. A membrane valve according to claim 1, wherein the inner lateral surface of the guide recess is shaped cylindrically, wherein the prismatic guide section of the shank body of the assigned drive plunger bears on the inner lateral surface of the guide recess in a slidingly displaceable manner only with its outer side edges and wherein an intermediate space is present between the several outer side surfaces of the guide section and the cylindrical inner lateral surface of the guide recess.

3. A membrane valve according to claim 2, wherein the inner lateral surface of the guide recess is circularly cylindrical.

4. A membrane valve according to claim 1, wherein the inner lateral surface of the guide recess has a polygonally contoured prismatic shaping with a succession of inner side edges and inner side surfaces, said edges and surfaces each extending in the height direction of the valve housing and said succession alternating in the circumferential direction of the guide recess, wherein the outer side surfaces of the guide section and the inner side surfaces of the guide recess each bear on one another in a slidingly movable manner in pairs.

5. A membrane valve according to claim 4, wherein the inner side edges of the guide recess are non-rounded.

6. A membrane valve according to claim 4, wherein the cross sections of the guide section and of the assigned guide recess are shaped congruently to one another at least in the region of the inner side surfaces and outer side surfaces.

7. A membrane valve according to claim 1, wherein the guide section is contoured at least rectangularly.

8. A membrane valve according to claim 1, wherein the outer lateral surface of the shank body of the at least one drive plunger at least in the region of the guide section has a regular polygonal outer contour and is shaped according to a regular prism.

9. A membrane valve according to claim 1, wherein the outer lateral surface of the shank body merges into the front end-face of the shank body via a conically tapering transition surface of a front shank body end section.

10. A membrane valve according to claim 1, wherein the outer lateral surface of the shank body has a polygonally contoured prismatic shaping over its entire length.

11. A membrane valve according to claim 1, wherein the drive plunger at its rear end region which is opposite to the front end-face of the shank body comprises a radially projecting annular support section, on which a restoring spring which at the other side is supported on the valve housing is supported, by way of which restoring spring the drive plunger is biased into an travel end position of its drive travel movement.

12. A membrane valve according to claim 1, wherein the valve housing delimits a drive chamber in which the drive device of the membrane valve interacts with the drive plunger for creating the drive travel movement.

13. A membrane valve according to claim 1, wherein two controllable valve channels which run into the control chamber at a distance to one another and whose channel run-outs in the control chamber are each framed by a valve seat pass through the base wall, wherein one of two drive plungers lies opposite each of the two valve seats at the side of the control membrane which is away from the base wall in the height direction of the valve housing, wherein the two drive plungers are each guided in a linearly displaceable manner in one of two guide recesses of the valve housing which are arranged next to one another and in the course of their drive travel movement are each capable of selectively positioning one of two closure sections of the control membrane in a closure position which is pressed onto the valve seat of one of the two controllable valve channels or in an open position which is lifted from this valve seat.

14. A membrane valve according to claim 13, wherein the drive device comprises a rocker switch which, whilst executing a switching movement, is pivotable to and fro relative to the valve housing about a pivot axis which is orthogonal to the height direction of the valve housing and which comprises two rocker arms which for creating the working movements of the two drive plungers each interact with a rear end-face of one the two drive plungers which is away from the control membrane.

15. A membrane valve according to claim 1, wherein an actuation unit of the drive device which is designed as an electromagnet unit and by way of which the drive travel movement of each drive plunger can be created is arranged on an upper side of the valve housing which is orientated in the height direction and which is away from the base wall.

16. A membrane valve, with a valve housing, in which a housing interior is formed, in which housing interior a flexible control membrane is arranged, said control membrane together with a base wall of the valve housing which lies opposite it in a height direction of the valve housing delimiting a control chamber which communicates with several valve channels, wherein at least one controllable valve channel of the several valve channels which runs into the control chamber and whose channel run-out in the control chamber is framed by a valve seat passes through the base wall, wherein a drive plunger lies opposite the valve seat of each controllable valve channel at the side of the control membrane which is away from the base wall in the height direction, said drive plunger comprising a shank body with a peripheral outer lateral surface, said shank body extending in a plunger longitudinal direction and with a guide section being linearly displaceably guided in the height direction in a guide recess of the valve housing which is delimited by an inner lateral surface, wherein each drive plunger can be driven by way of a drive device into a drive travel movement which is to and fro in the height direction of the valve housing, by which means a closure section of the control membrane which is arranged between a front end-face of the shank body which faces the base wall, and the opposite valve seat of a controllable valve channel is selectively movable into a closure position which is pressed upon the assigned valve seat or into an open position which is lifted from this valve seat, and wherein the outer lateral surface of the shank body of the drive plunger at least in the region of the guide section comprises a polygonally contoured prismatic shaping with a succession of outer side edges and outer side surfaces, said edges and surfaces extending in the plunger longitudinal direction and said succession alternating in the circumferential direction of the drive plunger,
  wherein each guide recess is formed by at least one length section of a wall opening, said wall opening extending in the height direction of the valve housing and passing through a guide wall of the valve housing which at the side of the control membrane which is away from the base wall extends transversely to the height direction of the valve housing and through which wall opening the assigned drive plunger extends with its shank body.

17. A membrane valve according to claim 16, wherein the outer side edges of the prismatic guide section of the shank body of the drive plunger are convexly rounded.

18. A membrane valve according to claim 16, wherein the outer lateral surface of the shank body is stepped in the plunger longitudinal direction, wherein the shank body comprises a front length section which via a ring step connects onto the non-stepped guide section and which has a smaller cross-sectional area than the guide section, and wherein the wall opening comprises a lower opening end section which connects onto the guide recess in the direction of the base wall and which conically widens in the direction of the base wall, and wherein the ring step of the shank body is always located within the guide recess independently of the travel position of the drive plunger.

19. A membrane valve according to claim 16, wherein the valve housing delimits a drive chamber in which the drive device of the membrane valve interacts with the drive plunger for creating the drive travel movement, and wherein the guide wall is arranged between the drive chamber and a membrane receiving chamber in the height direction of the valve housing, wherein the control membrane extends in the membrane receiving chamber and wherein the membrane receiving chamber is divided by the control membrane into the control chamber which communicates with the valve channels and into a force transmission chamber which faces the guide wall, wherein each drive plunger is coupled in a force transmitting manner to the control membrane in the force transmission chamber.

20. A membrane valve according to claim 19, wherein the control membrane at its outer edge is sealingly clamped in all around between a first housing part which forms the base wall and a second housing part of the valve housing which forms the guide wall.

21. A membrane valve, with a valve housing, in which a housing interior is formed, in which housing interior a flexible control membrane is arranged, said control membrane together with a base wall of the valve housing which lies opposite it in a height direction of the valve housing delimiting a control chamber which communicates with several valve channels, wherein at least one controllable valve channel of the several valve channels which runs into the control chamber and whose channel run-out in the control chamber is framed by a valve seat passes through the base wall, wherein a drive plunger lies opposite the valve seat of each controllable valve channel at the side of the control membrane which is away from the base wall in the height direction, said drive plunger comprising a shank body with a peripheral outer lateral surface, said shank body extending in a plunger longitudinal direction and with a guide section being linearly displaceably guided in the height direction in a guide recess of the valve housing which is delimited by an inner lateral surface, wherein each drive plunger can be driven by way of a drive device into a drive travel movement which is to and fro in the height direction of the valve housing, by which means a closure section of the control membrane which is arranged between a front end-face of the shank body which faces the base wall, and the opposite valve seat of a controllable valve channel is selectively movable into a closure position which is pressed upon the assigned valve seat or into an open position which is lifted from this valve seat, and wherein the outer lateral surface of the shank body of the drive plunger at least in the region of the guide section comprises a polygonally contoured prismatic shaping with a succession of outer side edges and outer side surfaces, said edges and surfaces extending in the plunger longitudinal direction and said succession alternating in the circumferential direction of the drive plunger, wherein the outer lateral surface of the shank body is stepped in the plunger longitudinal direction, wherein the shank body comprises a front length section which via a ring step connects onto the non-stepped guide section and which has a smaller cross-sectional area than the guide section.

* * * * *